(12) United States Patent
Hickerson et al.

(10) Patent No.: US 7,266,236 B2
(45) Date of Patent: Sep. 4, 2007

(54) ACCELERATED HANDWRITTEN SYMBOL RECOGNITION IN A PEN BASED TABLET COMPUTER

(75) Inventors: Kevin Hickerson, Pasadena, CA (US); Uri Eden, Somerville, MA (US)

(73) Assignee: California Institute of Technology, Pasadena, CA (US)

(*) Notice: Subject to any disclaimer, the term of this patent is extended or adjusted under 35 U.S.C. 154(b) by 382 days.

(21) Appl. No.: 09/848,953

(22) Filed: May 3, 2001

(65) Prior Publication Data

US 2002/0118879 A1    Aug. 29, 2002

Related U.S. Application Data

(60) Provisional application No. 60/201,581, filed on May 3, 2000.

(51) Int. Cl.
*G06K 9/00*    (2006.01)
(52) U.S. Cl. .................. 382/155; 382/292; 382/309; 704/227; 704/228; 704/256
(58) Field of Classification Search ............. 382/173, 382/187, 292, 155, 309; 704/232, 227, 228, 704/256
See application file for complete search history.

(56) References Cited

U.S. PATENT DOCUMENTS

| | | | | | |
|---|---|---|---|---|---|
| 5,107,541 A | * | 4/1992 | Hilton | .................. | 382/123 |
| 5,442,715 A | * | 8/1995 | Gaborski et al. | ........... | 382/187 |
| 5,455,901 A | * | 10/1995 | Friend et al. | ............... | 715/507 |
| 5,542,006 A | * | 7/1996 | Shustorovich et al. | ...... | 382/156 |
| 5,687,254 A | * | 11/1997 | Poon et al. | .................. | 382/229 |
| 5,802,204 A | * | 9/1998 | Basehore | ..................... | 382/186 |
| 5,812,698 A | * | 9/1998 | Platt et al. | ................... | 382/186 |
| 5,854,855 A | * | 12/1998 | Errico et al. | ................. | 382/187 |
| 5,883,986 A | * | 3/1999 | Kopec et al. | ............... | 382/310 |
| 5,940,532 A | * | 8/1999 | Tanaka | ........................ | 382/185 |
| 6,154,722 A | * | 11/2000 | Bellegarda | .................. | 704/257 |
| 6,298,154 B1 | * | 10/2001 | Cok | ........................... | 382/186 |
| 6,633,282 B1 | * | 10/2003 | Monroe | ...................... | 345/179 |

OTHER PUBLICATIONS

S.H.Paek et al., "On-Line Korean Character Recognition by using Two Types of Neural Networks", 1993, International Joint Conference on Neural Networks. pp. 2113-2116.*

* cited by examiner

*Primary Examiner*—Sheela Chawan
(74) *Attorney, Agent, or Firm*—J. D. Harriman, II; DLA Piper US LLP

(57) ABSTRACT

The present invention provides a method and apparatus for accelerated handwritten symbol recognition in a pen based tablet computer. In one embodiment, handwritten symbols are translated into machine readable characters using special purpose hardware. In one embodiment, the special purpose hardware is a recognition processing unit (RPU) which performs feature extraction and recognition. A user inputs the handwritten symbols and software recognition engine preprocesses the input to a reduced form. The data from the preprocessor is sent to the RPU which performs feature extraction and recognition. In one embodiment, the RPU has memory and the RPU operates on data in its memory. In one embodiment, the RPU uses a hidden Markov model (HMM) as a finite state machine that assigns probabilities to a symbol state based on the preprocessed data from the handwritten symbol. In another embodiment, the RPU recognizes collections of symbols, termed "wordlets," in addition to individual symbols.

69 Claims, 11 Drawing Sheets

ACCELERATED HANDWRITTEN SYMBOL RECOGNITION IN A PEN BASED TABLET COMPUTER

FEDERAL SUPPORT STATEMENT

The present application is based on U.S. provisional patent application No. 60/201,581 filed on May 3, 2000, and claim priority to that application.

BACKGROUND OF THE INVENTION

1. Field of the Invention

The present invention relates to the field of image recognition, and in particular to a method and apparatus for accelerated handwritten symbol recognition in a pen based tablet computer.

2. Background Art

In some computer systems, handwritten symbols are input to the system. These symbols are translated by the computer system to machine readable characters. This translation is typically computation intensive. In some computer systems, battery operated portable devices for example, the general purpose central processing unit (CPU) used for the translation is inefficient in its power consumption during the translation operation. Thus, the battery is drained more rapidly. Additionally, some battery operated systems are limited in computational power. When a real-time translation requirement is placed on symbol translation, the limited computational power results in a limited degree of accuracy in the translation process. These problems can be better understood with a review of handwritten data entry.

Handwritten Data Entry

A typical computer system consists of a central processing unit (CPU), main memory such as random access memory (RAM), a data entry device, including a positioning device, a mass storage device such as one or more disk drives, a display and/or a printer. In the prior art, the data entry device often consists of a keyboard, on which a user enters data by typing. The positioning device of a prior art computer system may consist of a "mouse" or other cursor positioning device.

Computer systems also exist that are directed to handwritten data entry rather than keyboard data entry. These systems are often characterized by the use of a pen, stylus, or other writing device, to enter handwritten data directly on the display of the computer system. Alternatively, these systems may provide for a user to enter data on a digitizing tablet or other input device, with the image of the written input displayed on a separate computer display output device. The writing device for entering handwritten or freestyle stroke input information is not limited to a pen or stylus, but may be any input device such as a mouse, trackball, pointer, or even a person's fingers. Such systems are not necessarily limited to receiving data generated by human users. For example, machine generated data may also be inputted and accepted to such systems.

One class of this handwriting entry computer system that receives handwritten data input is referred to as a "pen based" computer system. In a pen based computer system, a writer can input information on a display by "writing" directly on the display. A writing device, such as a pen or stylus, is used to enter information on the display. In a typical pen-based computer system, a user touches the stylus to the display and writes as the user would on a piece of paper, by making a series of pen strokes to form letters and words. A line appears on the display that follows the path of travel of the pen point, so that the pen strokes appear on the display as ink would appear on a handwritten page. Thus, the user can enter information into the computer by writing on the display. Pen based computers typically have a display surface that serves as both an input receiving device and as an output display device.

Handwritten Data Translation

One characteristic of handwriting entry computer systems is the ability to translate original handwritten symbols into machine readable words or characters for display. This translation is accomplished via a "character recognition" algorithm. The handwritten symbols are translated into, for example, ASCII characters. After the translation, the appearance of the displayed characters is as if they had been typed in via a keyboard.

To translate a handwritten character into a machine readable character, the handwritten character is compared to a library of characters to determine if there is a match. A description, or "template" for each character is defined and stored in memory. Handwritten characters are compared to the stored templates. Match coefficients, reflecting how closely a handwritten character matches the template of a stored character, are calculated for each template character. The template character with the highest match coefficient is identified. The character represented by this template provides the "best fit" for the handwritten character. If the match coefficient for the "best fit" character exceeds a predetermined minimum threshold, the "best fit" character is adopted. If the match coefficient for the "best fit" character is less than the minimum threshold value, no translation is done. If the handwritten character cannot be translated, the character must be re-entered.

A disadvantage of current character recognition algorithms is limited accuracy. Often, handwritten characters are not translated at all or are mistranslated as an ASCII character other than the handwritten character. The mistranslated character must then be rewritten by the user, sometimes repeatedly, until a correct translation is made.

Handwriting Recognition in Portable Systems

A portable pen-based computer systems is constrained by the amount of power stored in its battery. Typically, portable pen-based computer systems, which require handwriting recognition (HWR), rely on grid based single character recognition, which forces users to print characters in stylized formats. This approach is not suitable for entering large text segments. A better approach for entering large text segments is to enable users to write naturally on the screen in their own personal, unconstructed style using HWR algorithms. However, HWR algorithms require a large amount of computation to translate handwritten symbols into machine readable characters. Typical portable pen-based computer systems lack the computational power necessary to satisfactorily perform translations.

Typical portable pen-based computer systems use a general purpose CPU for HWR calculations. Typically, a general purpose CPU is inefficient in power consumption during HWR calculations. The general purpose CPU is designed to perform more than HWR calculations, so some functions of the CPU are powered, but not used for the HWR calculation. Additionally, a general purpose CPU is inefficient in speed during HWR calculations. The general purpose CPU must be able to perform certain operating system tasks while completing HWR calculations. Thus, the speed with which HWR calculations are completed is diminished. As a result, fewer HWR calculations may be completed in a limited amount of time. Thus, if the time for HWR is limited, the accuracy of the translation is also limited.

Single Symbol Translation

Typically, portable pen-based computer systems translate one character at a time. However, such a scheme is difficult when a user has poor handwriting. For example, FIG. 1 illustrates a word where single symbol translation is difficult. A single symbol translation system has difficulty translating the letters "m" (100), "i" (110), and "n" (120) in the word "jumping" (130) in FIG. 1. However, the word is legible to the user.

SUMMARY OF THE INVENTION

The present invention provides a method and apparatus for accelerated handwritten symbol recognition in a pen based tablet computer. In one embodiment, handwritten symbols are translated into machine readable characters using hidden Markov models. In one embodiment, handwritten symbols are translated into machine readable characters using special purpose hardware. In one embodiment, the special purpose hardware is a recognition processing unit (RPU) which performs feature extraction and recognition. A user inputs the handwritten symbols and software recognition engine preprocesses the input to a reduced form. In one embodiment, the preprocessor is fully information preserving.

The data from the preprocessor is sent to the RPU which performs feature extraction and recognition. In one embodiment, the RPU has memory and the RPU operates on data in its memory. In one embodiment, the RPU uses a hidden Markov model (HMM) as a finite state machine that assigns probabilities to a symbol state based on the preprocessed data from the handwritten symbol. In another embodiment, the RPU recognizes collections of symbols, termed "wordlets," in addition to individual symbols.

In one embodiment, the software recognition engine uses the data from the RPU in a postprocessor. The postprocessor computes a stream of symbol observation events from data produced by the RPU and writer confirmation data. In one embodiment, the postprocessor also uses information about context, spelling, grammar, past word usage and user information to improve the accuracy of the symbols produced.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1:
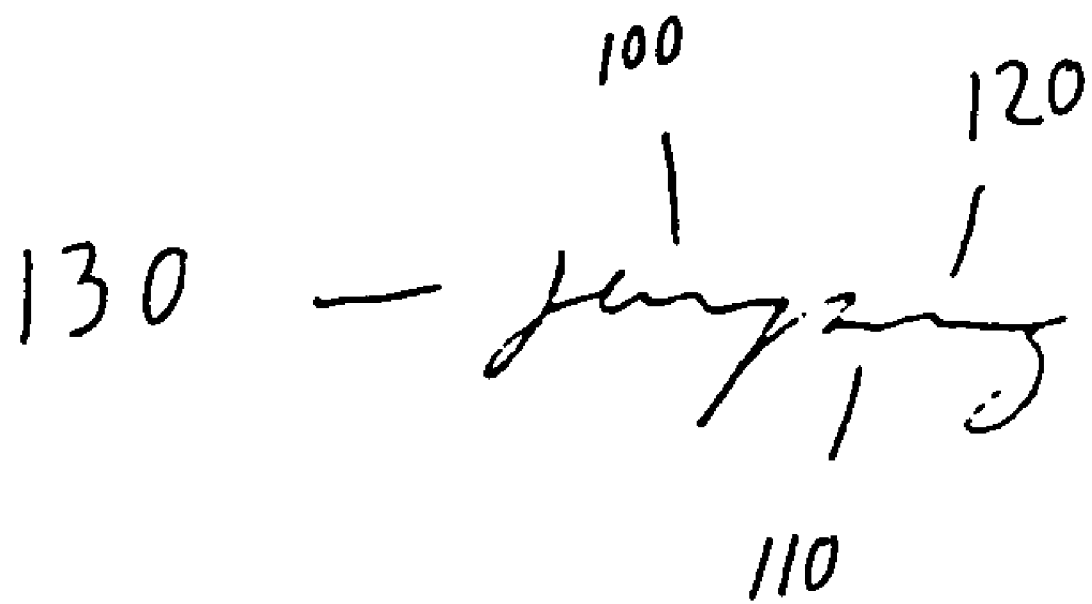
FIG. 1 is a block diagram of a word where single symbol translation is difficult.

The invention is a method and apparatus for accelerated handwritten symbol recognition in a pen based tablet computer. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Handwriting Recognition Calculations

In one embodiment, HMM calculations are used to determine the probability of a symbol appearing in a sequence of symbol observations. A HMM with N states, M observation symbols, the state alphabet $V_s=\{S_1, S_2, \ldots, S_N\}$ and the emission alphabet $V_e=\{v_1, v_2, \ldots, v_M\}$ is defined by the triplet $\lambda=(A, B, \pi)$. A is a state transition matrix defined as $a_{ij}=P(q_{t+1}=S_j|q_t=S_i)$ for $1 \leq i \leq N$ and $1 \leq j \leq N$, which means the probability that the state at time t+1 is state j given that the state at time t is state i. B is the observation probability matrix defined as $b_j(k)=P(v_k|q_t=S_j)$ for $1 \leq j \leq N$ and $1 \leq k \leq M$, which means the probability of the observation being $v_k$ given that the state at time t is state j. p is an initial state distribution defined as $\pi_i=P(q_1=S_i)$, which means the probability of the state at time 1 is state i.

If we have an observation sequence $O=(o_1 o_2 \ldots o_T)$, the RPU calculates the probability of this sequence given the model $\lambda$. This value is calculated by determining a series of values termed forward variables defined as $\alpha_i(t)=P(o_1 o_2 \ldots o_t, q_t=S_i|\lambda)$, which means the probability of the observation sequence from 1 to t and the state at time t being state i given $\lambda$. These values are calculated by initializing the variable as $\alpha_i(1)=\pi_i b_i(o_1)$ for $1 \leq i \leq N$. Further values are calculated using $$\alpha_j(t+1) = b_j(o_{t+1}) \sum_{i=1}^{N} \alpha_i(t) a_{ij}$$

for $1 \leq t \leq T-1$ and $1 \leq j \leq N$. The probability of the sequence given $\lambda$ is defined by $$P(P\mid\lambda)=\sum_{i=1}^{N}\alpha_i(T).$$

Similarly, a backward variable is defined as $\beta_j(t)=P(o_{t+1}o_{t+2}\ldots o_T\mid q_t=S_i,\lambda)$, which means the probability of the observation sequence from $t+1$ to $T$ given state at time $t$ being state $i$ given $\lambda$. The backward variables are initialized as $\beta_i(T)=1$ for $1\leq i\leq N$. Further values are calculated using $$\beta_j(t)=\sum_{j=1}^{N}a_{ij}b_j(o_{t+1})\beta_1(t+1)$$

for $1\leq t\leq T-1$ and $1\leq j\leq N$.

The calculations to compute forward and backward variables are performed in the RPU. Thus, probabilities can be calculated for each new symbol to determine which symbols the new symbol is most likely to be. In one embodiment, the HMM calculations are performed on a general purpose computational unit.

Pre-processed symbol observations are the input to the HMMs. In one embodiment, the symbol observation alphabet (the emission alphabet) is comprised of angles of equalized segments. In other embodiment, more complex symbol observation alphabets are used. In one embodiment, at least one HMM is created for each symbol in the output alphabet. The probability of each symbol given the observation sequence is calculated by each symbol's HMM. In one embodiment, a post-processing unit uses the information from the HMMs to determine the appropriate symbol.

Training A, B and $\pi$

It is desirable to select the parameters A, B and $\pi$ of $\lambda$ that maximize the probability of a sequence in the training set given $\lambda$. One algorithm used to determine the parameters is the Baum-Welch method. The Baum-Welch method guarantees a monotonically increasing probability and converges quickly.

First, a joint event variable is defined as $\epsilon_{ij}(t)=P(q_t=S_i, q_{t+1}=S_j\mid O,\lambda)$, which means that the probability of the state at time $t$ being state $i$ and the state at time $t+1$ being state $j$ given sequence O and $\lambda$. From the definitions of forward and backward variables, this becomes $\epsilon_{ij}(t)=(\alpha_i(t)a_{ij}b_j(o_{t+1})\beta_j(t+1))/P(O\mid\lambda)$.

Additionally, a state variable is defined as $\gamma_i(t)=P(q_t=S_i\mid O,\lambda)$, which means the probability of the state at time $t$ being state $i$ given sequence O and $\lambda$. From the definitions of forward and backward variables, this becomes $\gamma_i(t)=(\alpha_i(t)\beta_j(t))/P(O\mid\lambda)$.

A new $\lambda$, $\lambda'$, is calculated as follows. A new a, a', is calculated as $$a'_{ij}=\sum_{t=1}^{T-1}\varepsilon_{ij}(t)\bigg/\sum_{t=1}^{T-1}\gamma_i(t).$$

A new b, b', is calculated as $$b'_j=\sum_{t=1,o_t=v_k}^{T}\gamma_j(t)\bigg/\sum_{t=1}^{T}\gamma_j(t).$$

A new $\pi$, $\pi'$, is calculated as $\pi'_i=\gamma_i(1)$.

A variation of the Baum-Welch method, termed the "Levingson method," calculates $\lambda'$ as follows when K observation sequences are used to adjust the parameters. A new a, a', is calculated as $$a'_{ij}=\sum_{k=1}^{K}\sum_{t=1}^{T-1}\varepsilon_{ij}^{(k)}(t)\bigg/\sum_{k=1}^{K}\sum_{t=1}^{T-1}\gamma_i^{(k)}(t).$$

A new b, b', is calculated as $$b'^{(k)}_j=\sum_{k=1}^{K}\sum_{t=1,o_t=v_k}^{T}\gamma_j^{(k)}(t)\bigg/\sum_{k=1}^{K}\sum_{t=1}^{T}\gamma_j^{(k)}(t).$$

A new $\pi$, $\pi'$, is calculated as $$\pi'_i=1/K*\sum_{k=1}^{K}\gamma_i^{(k)}(1).$$

Special Purpose Hardware for Recognition Processing

In one embodiment, handwritten symbols are translated into machine readable characters using special purpose hardware. In one embodiment, the special purpose hardware is a recognition processing unit (RPU) which performs feature extraction and recognition. In another embodiment, a user inputs the handwritten symbols and software recognition engine preprocesses the input to a reduced form. In one embodiment, the preprocessor is fully information preserving.

Figure 2:
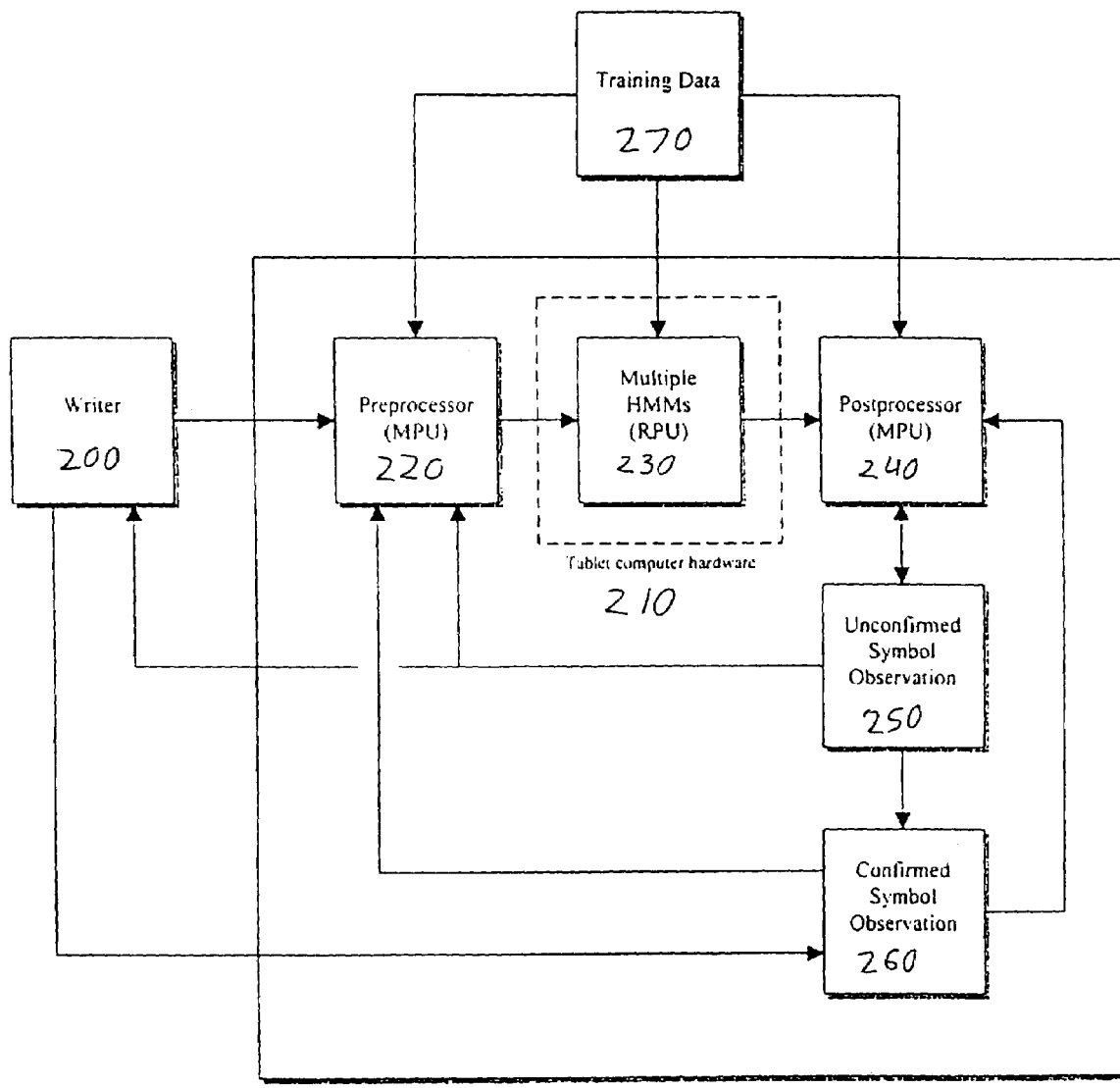
FIG. 2 is a block diagram of a pen-based (tablet) computer handwriting symbol recognition system in accordance with one embodiment of the present invention.

FIG. 2 illustrates a pen-based (tablet) computer handwriting symbol recognition system in accordance with one embodiment of the present invention. A writer (200) enters handwritten symbols into the tablet computer (210). The handwritten symbols operated upon by a preprocessor (220) running on the main processing unit (MPU). The data from the preprocessor is sent to an RPU (230). The RPU is implemented as special-purpose hardware. In one embodiment, the RPU is a circuit configured to perform hidden Markov model (HMM) computations. The data from the RPU is used by a postprocessor (240) running on the MPU to produce an unconfirmed symbol observation (250).

The unconfirmed symbol observation is presented to the writer. The writer can confirm a symbol, reject a symbol or make no determination. The postprocessor uses confirmed symbol observations (260), rejected symbol observations and unconfirmed symbol observations to adjust how it makes symbol observations. The preprocessor also uses confirmed symbol observations and unconfirmed symbol observations to adjust how it preprocesses the handwritten symbols. Additionally, training data (270) is used by the preprocessor, the RPU, and the postprocessor to adjust their calculation to achieve more accurate symbol translations.

The special purpose hardware of the RPU enables the system to calculate more handwriting recognition calculations in the same amount of time when compared to a system where handwriting recognition calculations are performed by a general purpose processor (the MPU). In one embodiment, the RPU uses parallel processing to make multiple handwriting recognition calculations each clock cycle. Typically, a general purpose processor requires multiple clock cycles to perform one handwriting recognition calculation. In one embodiment, the RPU performs eight handwriting recognition calculations in parallel for each clock cycle. Since the RPU only performs handwriting recognition calculations, no power is wasted during the calculation. Thus, the same amount of handwriting recognition calculations will require less power when computed by an RPU than when computed by a general purpose processor.

Memory on the RPU

Figure 3:
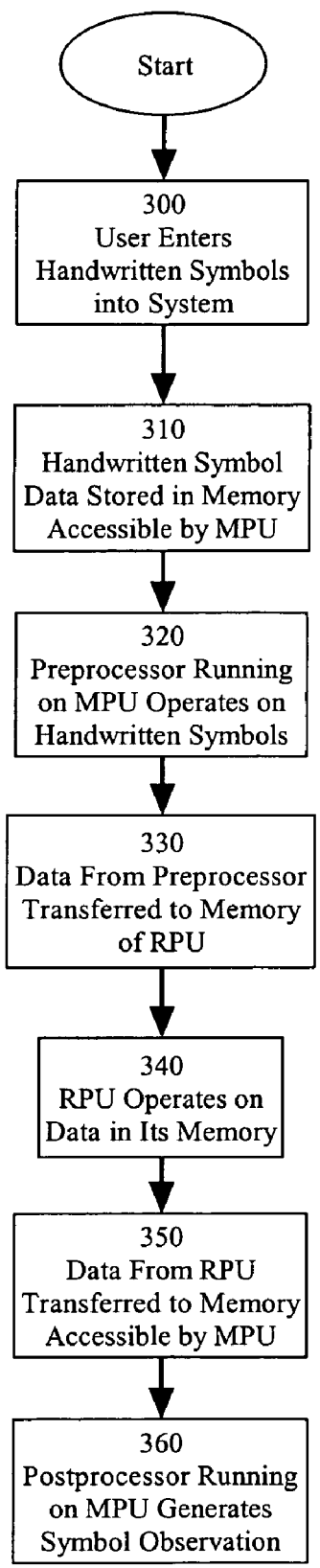
FIG. 3 is a flow diagram of the process of translating handwritten symbols in accordance with one embodiment of the present invention.

In one embodiment, the data from the preprocessor is sent to the RPU which performs feature extraction and recognition. In another embodiment, the RPU has memory and the RPU operates on data in its memory. FIG. 3 illustrates the process of translating handwritten symbols in accordance with one embodiment of the present invention. At step 300, a user enters handwritten symbols into the system. At step 310, the handwritten symbol data is stored in memory accessible by the MPU. At step 320, a preprocessor running on the MPU operates on the handwritten symbols. At step 330, the data from the preprocessor is transferred to the memory of an RPU. At step 340, the RPU operates on the data in its memory. At step 350, the data from the RPU is transferred to the memory accessible by the MPU. At step 360, a postprocessor running on the MPU generates a symbol observation.

Figure 4:
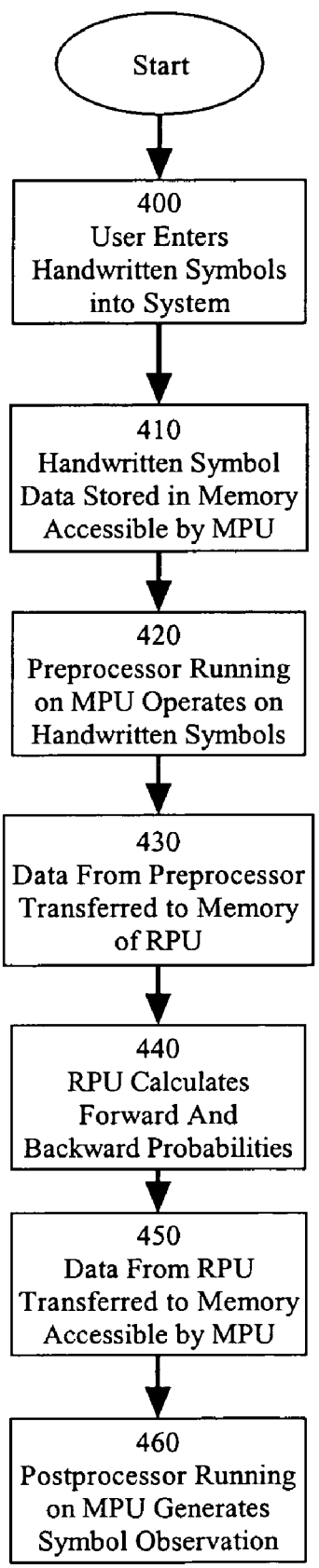
FIG. 4 is a flow diagram of the process of translating handwritten symbols wherein the RPU calculates forward and backward probabilities in accordance with one embodiment of the present invention.

FIG. 4 illustrates the process of translating handwritten symbols wherein the RPU calculates forward and backward probabilities in accordance with one embodiment of the present invention. At step 400, a user enters handwritten symbols into the system. At step 410, the handwritten symbol data is stored in memory accessible by the MPU. At step 420, a preprocessor running on the MPU operates on the handwritten symbols. At step 430, the data from the preprocessor is transferred to the memory of an RPU. At step 440, the RPU calculates forward and backward probabilities. At step 450, the data from the RPU is transferred to the memory accessible by the MPU. At step 460, a postprocessor running on the MPU generates a symbol observation.

Figure 5:
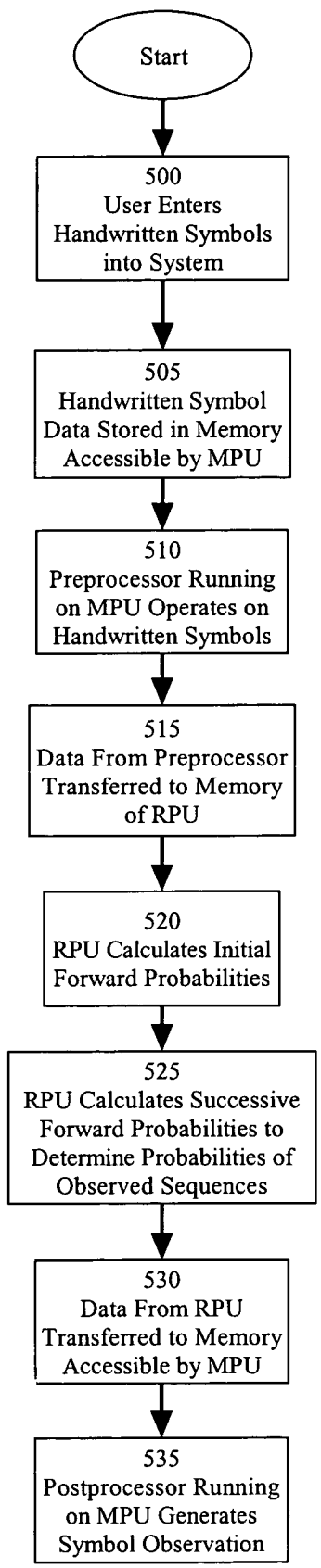
FIG. 5 is a flow diagram of the process of translating handwritten symbols wherein the RPU calculates forward probabilities in accordance with one embodiment of the present invention.

FIG. 5 illustrates the process of translating handwritten symbols wherein the RPU calculates forward probabilities in accordance with one embodiment of the present invention. At step 500, a user enters handwritten symbols into the system. At step 505, the handwritten symbol data is stored in memory accessible by the MPU. At step 510, a preprocessor running on the MPU operates on the handwritten symbols. At step 515, the data from the preprocessor is transferred to the memory of an RPU. At step 520, the RPU calculates initial forward probabilities, $\alpha_i(1)$. At step 525, the RPU calculates successive forward probabilities ($\alpha_i(2)$, $\alpha_i(3)$, . . . , $\alpha_i(t)$) to determine the probabilities of the observed sequences. At step 530, the data from the RPU is transferred to the memory accessible by the MPU. At step 535, a postprocessor running on the MPU generates a symbol observation.

Figure 6:
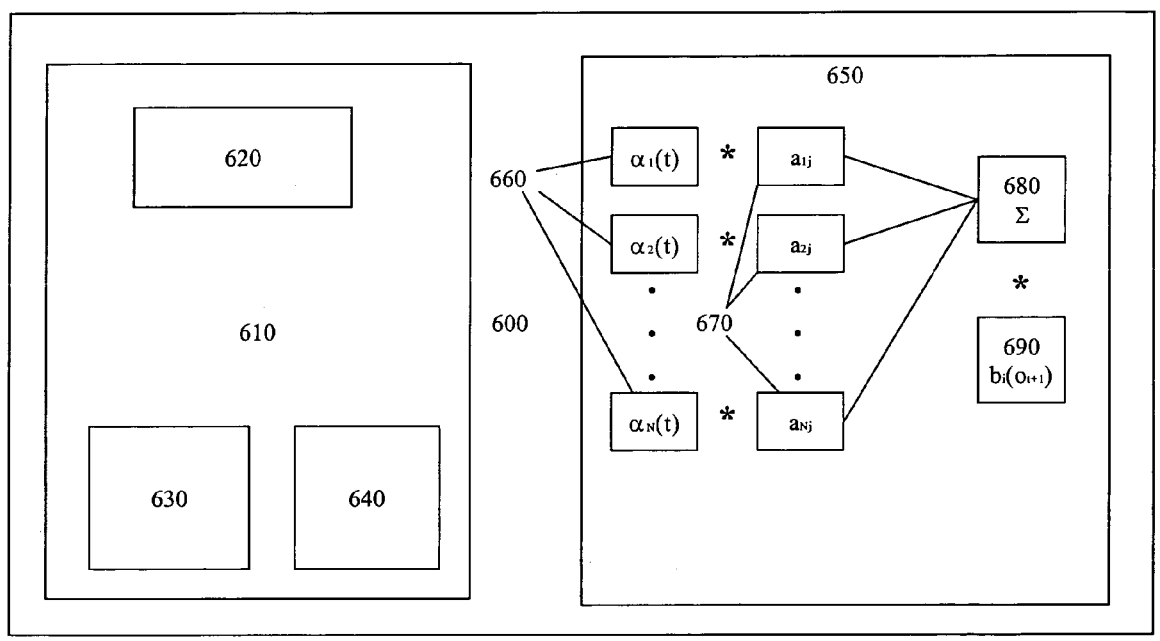
FIG. 6 is a block diagram of an RPU in accordance with one embodiment of the present invention.

FIG. 6 illustrates an RPU in accordance with one embodiment of the present invention. The RPU 600 has a memory unit 610 which stores $a_{ij}$ 620, $b_i(o_{t+1})$ 630 and values of $\alpha_i(t)$ 640 as they are calculated. Initially, the values of $\alpha_i(t)$ are set to their initial values. Additionally, the RPU has a HMM calculation unit 650. The HMM has N $\alpha_i(t)$ units 660. Each $\alpha_i(t)$ unit is multiplied by the appropriate $a_{ij}$ value in an $a_{ij}$ unit 670. All of the products are summed in a summation unit 680 and the sum is multiplied by the appropriate $b_i(o_{t+1})$ value stored in a $b_i(o_{t+1})$ unit 690. The resulting product is stored in the memory unit. Thus, the HMM calculates $$\alpha_j(t+1) = b_i(o_{t+1}) \sum_{i=1}^{N} \alpha_i(t) a_{ij}$$

for $1 \leq t \leq T-1$ and $1 \leq j \leq N$.

In some embodiments, the RPU has multiple HMM calculation units to enable multiple HMM calculations to take place in parallel. In one embodiment, the RPU has N HMM calculation units. Thus, values of $\alpha_j(t+1)$ are calculated in parallel for all values of j.

Symbols and Wordlets

In one embodiment, the RPU uses a hidden Markov model (HMM) as a finite state machine that assigns probabilities to a symbol based on the preprocessed data from the handwritten symbol. For example, a handwritten symbol may have a one in three probability of being an "e" and a one in four probability of being an "i." In another embodiment, the RPU recognizes collections of symbols, termed "wordlets," in addition to individual symbols.

For example, the RPU may recognize "tion" or "ing" as one symbol. The output alphabet contains "tion" and "ing" in addition to "t", "i", "o", "n" and "g". The ability to recognize a handwritten symbol as the wordlet "ing" improves the accuracy of translation. For example, in FIG. 1, the "i," the "n" and the "g" are all difficult to recognize individually. However, the "ing," together, is easier to recognize. Where one letter ends and the next begins becomes less important to the determination when the entire wordlet can be recognized by the RPU.

Probabilistic Context Free Grammar

In one embodiment, probabilistic context free grammar information is used to improve the accuracy of symbol translation. A probabilistic context free grammar is defined as G=($V_N$, $V_T$, P, S). $V_N$ is a nonterminal feature alphabet defined as $V_N$={$F_1$, $F_2$, . . . , $F_N$}. $V_T$ is a terminal feature alphabet defined as $V_T$={$w_1$, $w_2$, . . . , $w_M$}. All of the production rules of the grammar are of the form $F_i \rightarrow F_j F_k$ or $F_i \rightarrow w_k$ where $F_i \epsilon V_N$ are nonterminal features and $w_k \epsilon V_T$ are terminal features. $F_1$ is set equal to the entire string of terminals.

These production rules are defined by tensors A and B as P=(A, B). For the nonterminal features, a probability tensor A of rank 3 is defined as $a_{ijk}$=P($F_i \rightarrow F_j F_k$) for $1 \leq i \leq N$, $1 \leq j \leq N$ and $1 \leq k \leq N$. For the terminal features, a production probability matrix B is defined as $b_j(k)$=P($F_j \rightarrow w_k$) for $1 \leq j \leq N$ and $1 \leq k \leq M$.

In one embodiment, the probability of a string of terminals of length T, W=$w^1 w^2 \ldots w^T$, where $w^k \epsilon V_T$ is determined given a probabilistic context free grammar defined as P(W|G). In one embodiment, the probability of a subsequence, $W^{p,q}$=$w^p \ldots w^q$, termed an "inside probability" is calculated. The inside probability is initialized as $\beta_i(t, t)$=$b_i(w^t)$ for $1 \leq i \leq N$ and $1 \leq t \leq T$. Successive inside probabilities are determined by calculating $$\beta_i(p, q) = \sum_{j=1}^{N} \sum_{k=1}^{N} a_{ijk} \sum_{t=p}^{q-1} \beta_j(p, t) \beta_k(t+1, q)$$

for $1 \leq i \leq N$. At termination, $P(W|G) = \beta_1(1, T)$.

Similarly, the "outside probability" is the probability that the sub-sequence, $W^{p,q} = w^p \ldots w^q$, was generated by the nonterminal $F_i$ in the sequence $W = w^1 w^2 \ldots w^T$. The outside probability is initialized as $\alpha_i(1, T) = \delta_{1i}$ for $1 \leq i \leq N$. $\delta_{1i} = 1$ for $i=1$ and $\delta_{1i} = 0$ for all other values of i. Successive outside probabilities are determined by calculating $$\alpha_j(p, q) = \sum_{i=1}^{N} \sum_{k=1, j \neq k}^{N} a_{ijk} \sum_{t=q+1}^{T} \alpha_i(p, t) \beta_k(q+1, t) + \sum_{i=1}^{N} \sum_{k=1}^{N} a_{ijk} \sum_{t=1}^{p-1} \alpha_k(t, q) \beta_i(t, p-1)$$

for $1 \leq j \leq N$. At termination, $$P(W \mid G) = \sum_{j=1}^{N} b_j(w^t) \alpha_j(t, t)$$

for $1 \leq t \leq T$.

Training for Probabilistic Context Free Grammar

A joint feature probability is defined as $\xi_{ijk}(p, q) =$ $$\frac{\alpha_i(p, q) a_{ijk} \sum_{t=p}^{q-1} \beta_j(p, t) \beta_k(t+1, q)}{\beta_1(1, T)}.$$

A parent feature probability is defined as $\gamma_i(p) =$ $$\frac{\alpha_i(p, q) \beta_i(p, q)}{\beta_1(1, T)}.$$

The joint feature probability and parent feature probability are used to calculate new nonterminal probabilities and new terminal probabilities. The new nonterminal probabilities are calculated as $$\overline{a}_{ijk} = \frac{\sum_{p=1}^{T-1} \sum_{q=p}^{T} \xi_{ijk}(p, q)}{\sum_{p=1}^{T} \sum_{q=p}^{T} \gamma_i(p, q)}$$

for $1 \leq j \leq N$ and $1 \leq k \leq M$. The new terminal probabilities are calculated as $$\overline{b}_j(k) = \frac{\sum_{t=1, w^t = w_k}^{T} \gamma_i(t, t)}{\sum_{p=1}^{T} \sum_{q=p}^{T} \gamma_j(p, q)} \text{ for }$$

$1 \leq j \leq N$ and $1 \leq k \leq M$.

In one embodiment, the inside probability is used to determine a probability of a string of observed terminals given a probabilistic context free grammar. In one embodiment, the tensors of the probability are trained on a sample language by calculating new terminal and nonterminal probabilities using the above equations. In one embodiment, the inside probability is calculated using general purpose hardware. In another embodiment, the inside probability is calculated using special purpose hardware.

Context Consideration to Improve Accuracy

In one embodiment, the software recognition engine uses the data from the RPU in a postprocessor. The postprocessor computes a stream of symbol observation events from data produced by the RPU and writer confirmation data. In one embodiment, the postprocessor also uses information about context, spelling, grammar, past word usage and user information to improve the accuracy of the symbols produced.

Figure 7:
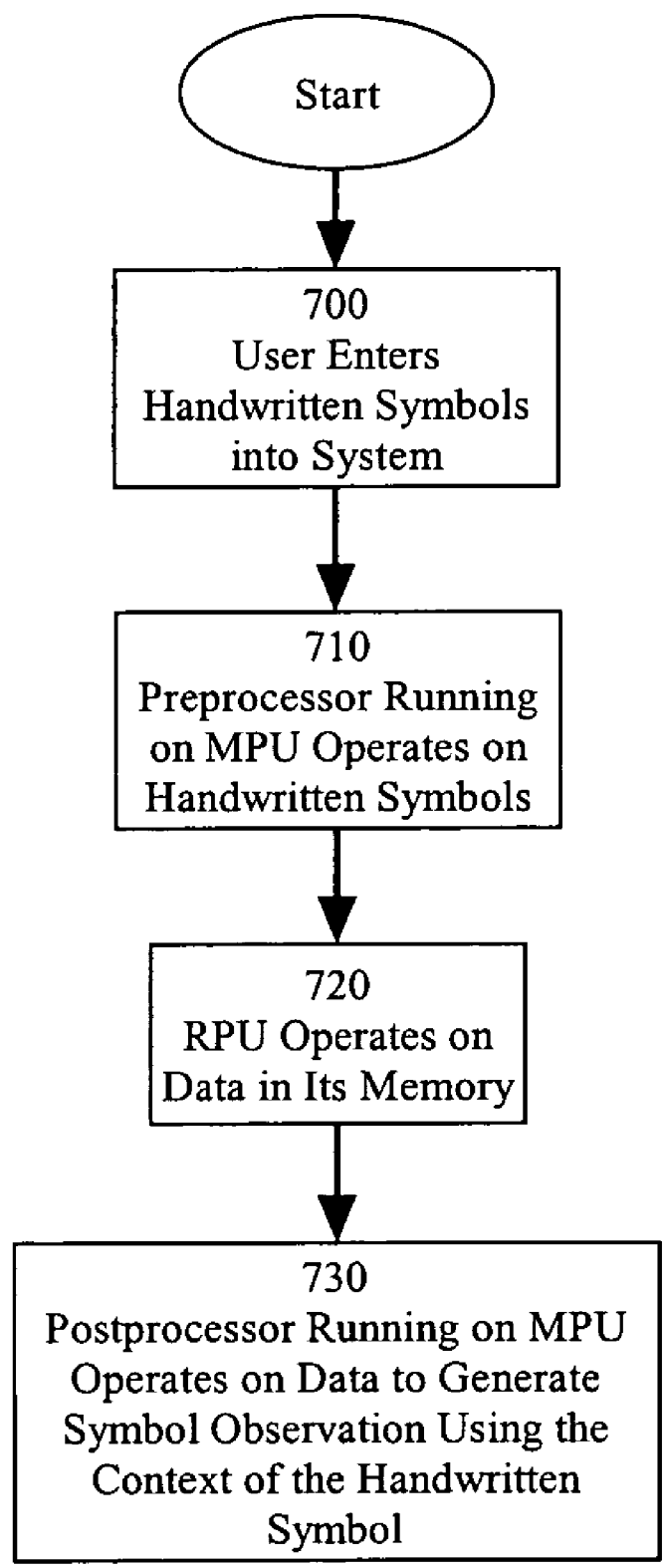
FIG. 7 is a flow diagram of the process of handwritten symbol translation using context information in accordance with one embodiment of the present invention.

FIG. 7 illustrates the process of handwritten symbol translation using context information in accordance with one embodiment of the present invention. At step 700, a user enters handwritten symbols into the system. At step 710, a preprocessor running on the MPU operates on the handwritten symbols. At step 720, the RPU operates on the data in its memory. At step 730, postprocessor running on the MPU operates on the data to generate a symbol observation using the context of the handwritten symbol.

Figure 8:
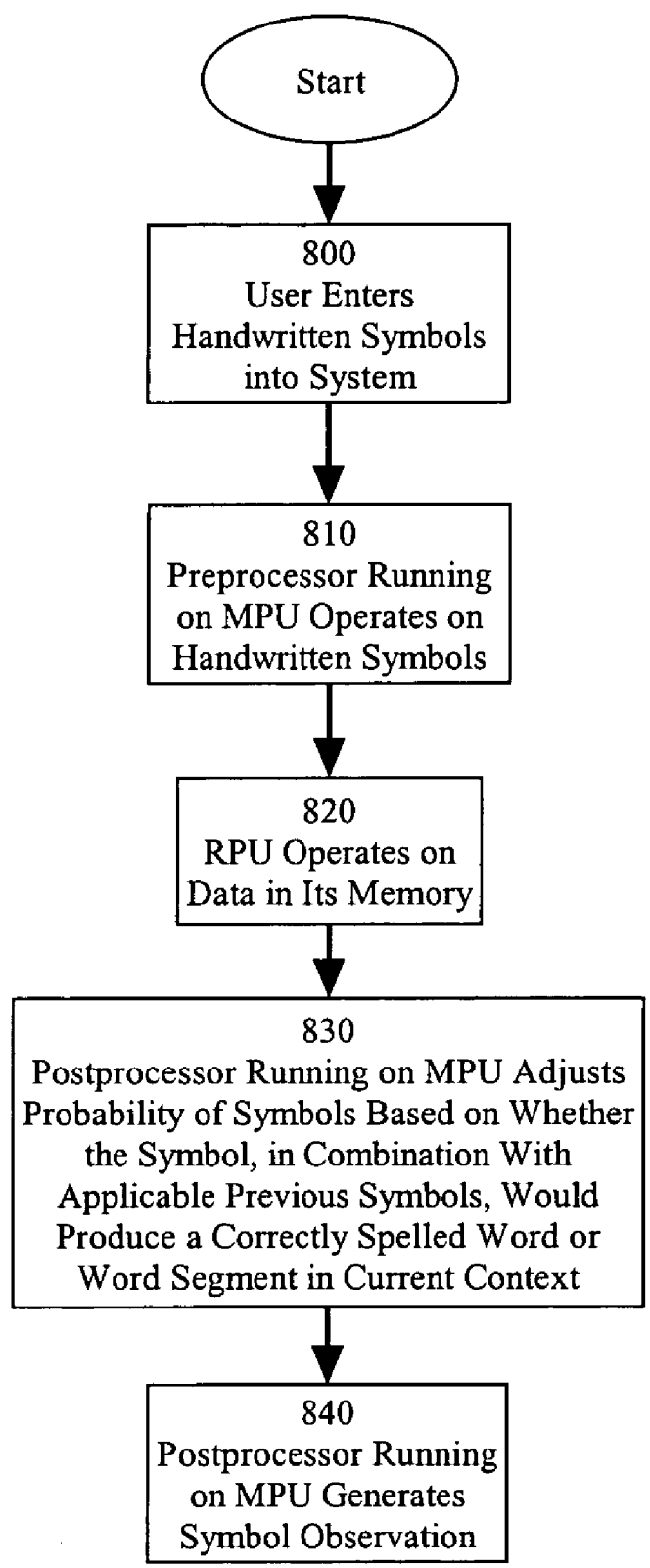
FIG. 8 is a flow diagram of the process of handwritten symbol translation using spelling information in accordance with one embodiment of the present invention.

In one embodiment, the postprocessor uses spelling information combined with previously generated symbols to determine the current symbol. FIG. 8 illustrates the process of handwritten symbol translation using spelling information in accordance with one embodiment of the present invention. At step 800, a user enters handwritten symbols into the system. At step 810, a preprocessor running on the MPU operates on the handwritten symbols. At step 820, the RPU operates on the data in its memory. At step 830, postprocessor running on the MPU adjusts the probability of symbols based on whether the symbol, in combination with applicable previous symbols, would produce a correctly spelled word or word segment in the current context. At step 840, the postprocessor generates a symbol observation. For example, the postprocessor would assign a higher probability to a symbol following a "q" being a "u" rather than being "ei".

Figure 9:
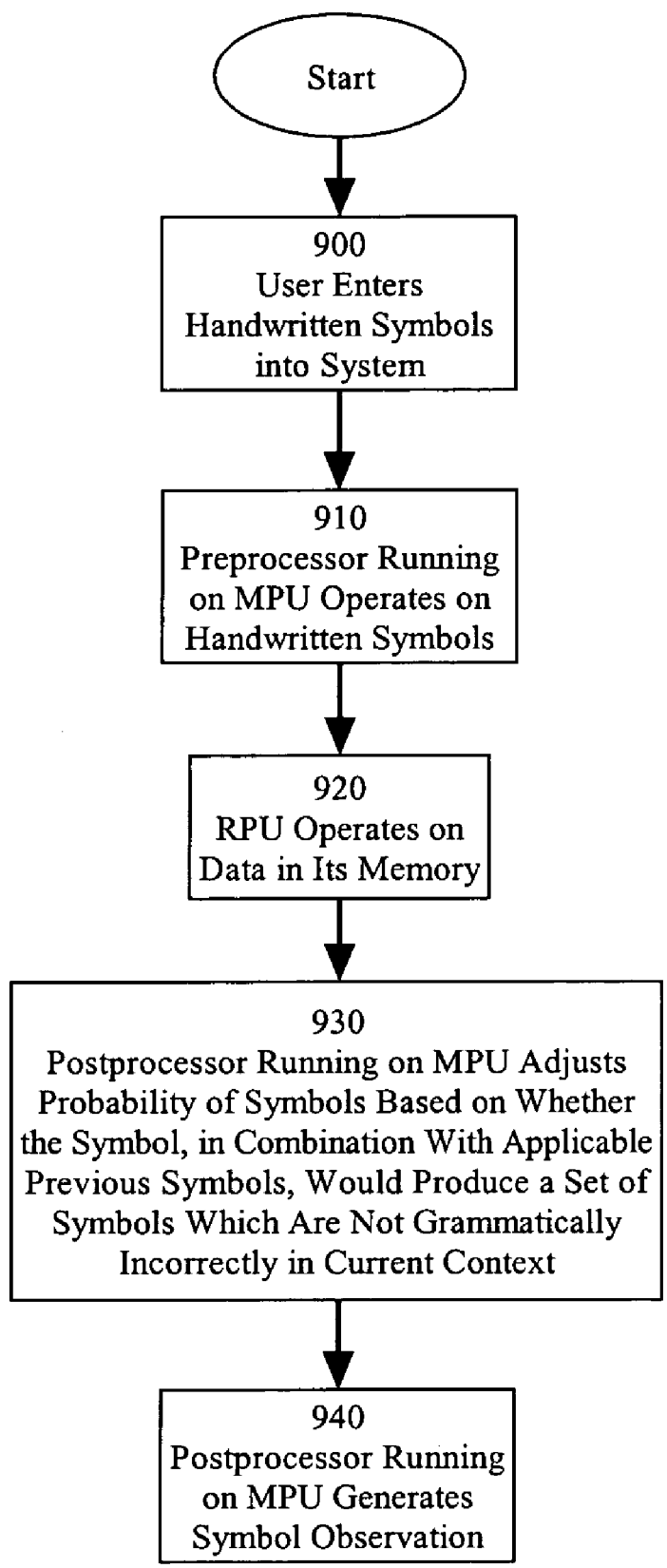
FIG. 9 is a flow diagram of the process of handwritten symbol translation using grammar information in accordance with one embodiment of the present invention.

In another embodiment, the postprocessor uses grammar information combined with previously generated symbols to determine the current symbol. FIG. 9 illustrates the process of handwritten symbol translation using grammar information in accordance with one embodiment of the present invention. At step 900, a user enters handwritten symbols into the system. At step 910, a preprocessor running on the MPU operates on the handwritten symbols. At step 920, the RPU operates on the data in its memory. At step 930, postprocessor running on the MPU adjusts the probability of symbols based on whether the symbol, in combination with applicable previous symbols, would produce a set of symbols which are not grammatically incorrectly in the current context. At step 940, the postprocessor generates a symbol observation. For example, a processor would give a higher probability to the symbol following "I am an inventor to" being an "o" than being a ".".

Figure 10:
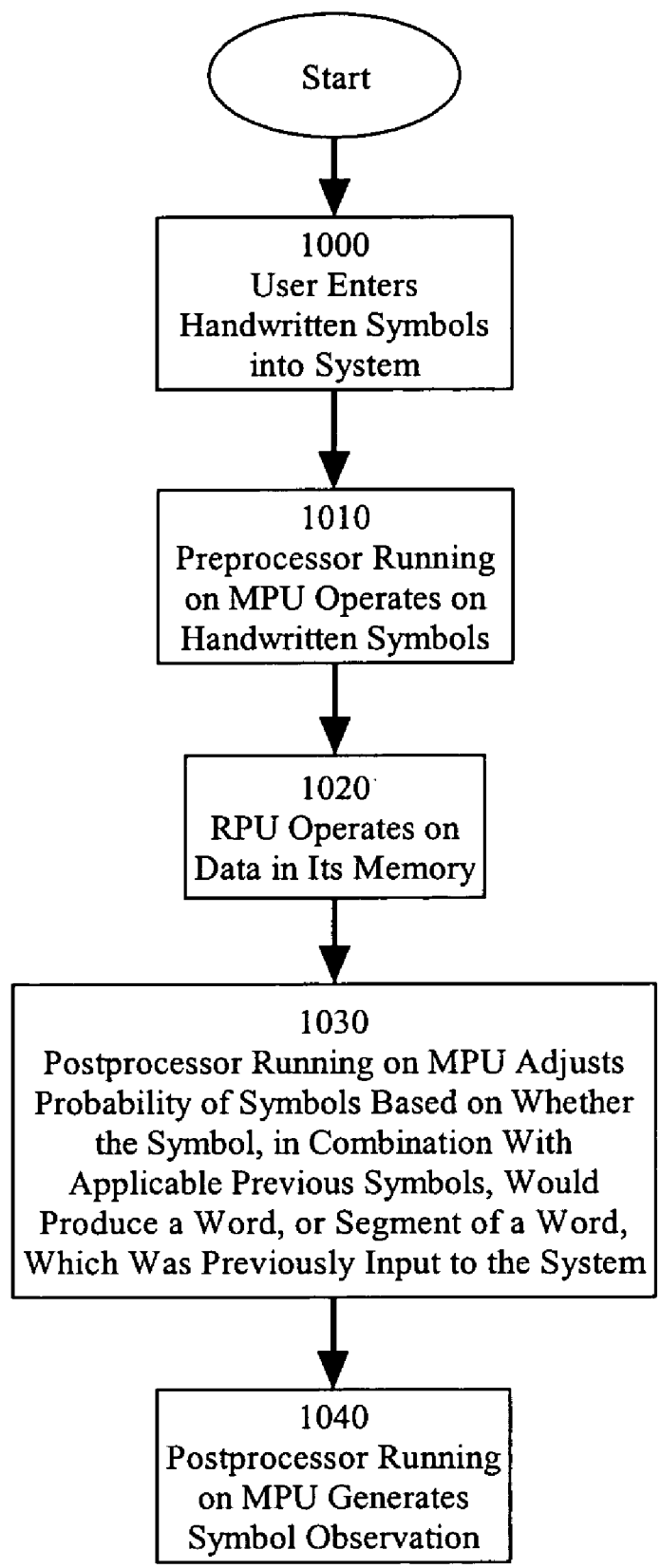
FIG. 10 is a flow diagram of the process of handwritten symbol translation using past word usage information in accordance with one embodiment of the present invention.

In one embodiment, the postprocessor uses past word usage information combined with previously generated symbols to determine the current symbol. FIG. 10 illustrates the process of handwritten symbol translation using past word usage information in accordance with one embodiment of the present invention. At step 1000, a user enters handwritten symbols into the system. At step 1010, a preprocessor running on the MPU operates on the handwritten symbols. At step 1020, the RPU operates on the data in its memory. At step 1030, postprocessor running on the MPU adjusts the probability of symbols based on whether the symbol, in combination with applicable previous symbols, would produce a word, or segment of a word, which was previously input to the system. At step 1040, the postprocessor generates a symbol observation.

Figure 11:
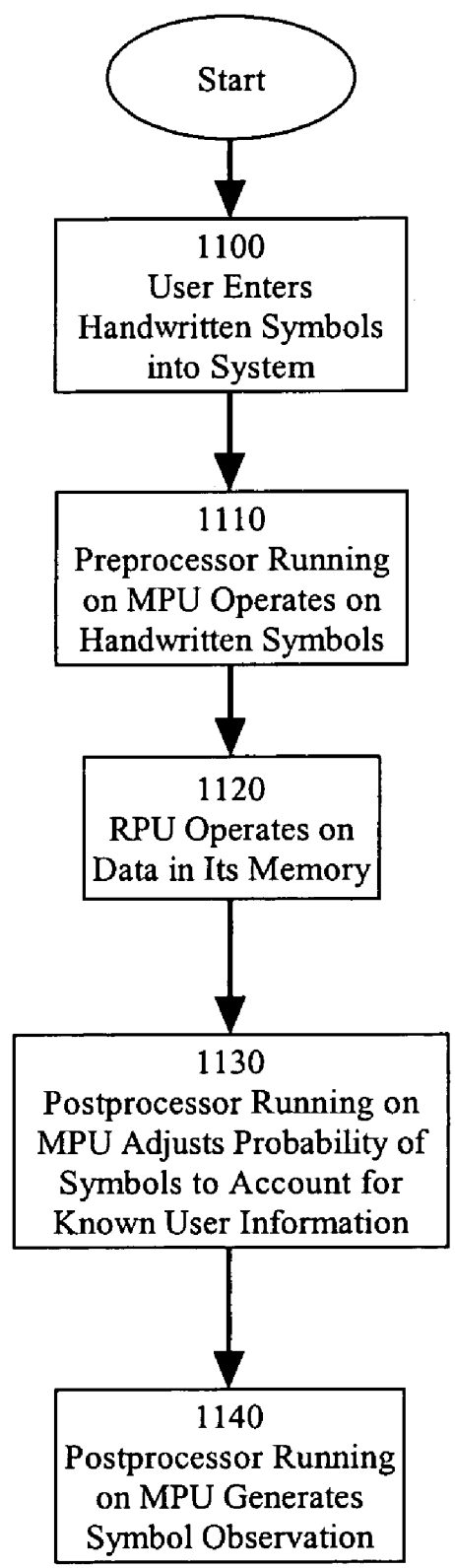
FIG. 11 is a flow diagram of the process of handwritten symbol translation using user information in accordance with one embodiment of the present invention.

In one embodiment, the postprocessor uses user information combined with previously generated symbols to determine the current symbol. FIG. 11 illustrates the process of handwritten symbol translation using user information in accordance with one embodiment of the present invention. At step 1100, a user enters handwritten symbols into the system. At step 1110, a preprocessor running on the MPU operates on the handwritten symbols. At step 1120, the RPU operates on the data in its memory. At step 1130, postprocessor running on the MPU adjusts the probability of symbols to account for known user information. For example, the system may know the user writes "ful" in a consistently distinct manner. At step 1140, the postprocessor generates a symbol observation.

Thus, a method and apparatus for accelerated handwritten symbol recognition in a pen based tablet computer is described in conjunction with one or more specific embodiments. The invention is defined by the following claims and their full scope and equivalents.

The invention claimed is:

1. A method of translating handwritten input to machine readable characters comprising:
    obtaining a first data item; and
    performing one or more recognition processing operations upon said data item by a preprocessor in conjunction with a confirmed symbol observation source, a special purpose hardware recognition processing unit, a postprocessor in conjunction with the confirmed symbol observation source to produce a second data item.

2. The method of claim 1 wherein said first data item is a handwritten symbol.

3. The method of claim 1 further comprising: altering said first data item by a preprocessor to a reduced form.

4. The method of claim 3 wherein said step of altering is fully information preserving.

5. The method of claim 3 further comprising: adjusting the operation of said preprocessor in accordance with a set of training data.

6. The method of claim 1 further comprising: selecting one or more machine readable characters by a postprocessor.

7. The method of claim 6 further comprising: presenting said machine readable characters to a user.

8. The method of claim 7 further comprising: obtaining an indication from said user of whether said machine readable characters are a correct translation of said data item.

9. The method of claim 6 further comprising: adjusting the operation of said postprocessor in accordance with a set of training data.

10. The method of claim 6 wherein said step of selecting comprises:
    determining a context of said data item.

11. The method of claim 10 wherein said step of selecting further comprises:
    determining a correctly spelled word wherein said machine readable characters appear in said correctly spelled word and said correctly spelled word is appropriate for said context.

12. The method of claim 10 wherein said step of selecting further comprises:
    determining whether machine readable characters are grammatically incorrect for said context.

13. The method of claim 10 wherein said step of selecting further comprises:
    determining a word in which said machine readable characters appear in said word and said word appeared previously in said context.

14. The method of claim 10 wherein said step of selecting further comprises:
    examining a set of user information.

15. The method of claim 1 wherein said special purpose hardware unit is configured to perform a first recognition processing operation and a second recognition processing operation in parallel.

16. The method of claim 1 wherein said special purpose hardware unit is configured to perform hidden Markov model computations.

17. The method of claim 1 wherein said special purpose hardware unit comprises: a memory unit.

18. The method of claim 1 wherein said data item is a combination of a plurality of handwritten symbols.

19. The method of claim 1 further comprising: adjusting the operation of said special purpose hardware unit in accordance with a set of training data.

20. A method of translating handwritten input to machine readable characters comprising:
    obtaining a first data item; and
    performing one or more hidden Markov model operations upon said data item using a preprocessor in conjunction with a confirmed symbol observation source, special purpose recognition processor hardware, and a postprocessor in conjunction with the confirmed symbol observation source.

21. The method of claim 20 wherein said hidden Markov model operations are forward probability calculations.

22. The method of claim 20 wherein said hidden Markov model operations are backward probability calculations.

23. The method of claim 20 wherein one or more wordlets are part of a symbol alphabet.

24. A handwritten input to machine readable characters translator comprising:
    a means for obtaining a first data item; and
    a preprocessor coupled to a confirmed symbol observation source, special purpose hardware recognition processing unit, and a postprocessor coupled to the confirmed symbol observation source configured to perform one or more recognition processing operations upon said data item to produce a second data item.

25. The handwritten input to machine readable characters translator of claim 24 wherein said first data item is a handwritten symbol.

26. The handwritten input to machine readable characters translator of claim 24 further comprising: a preprocessor configured to alter said first data item to a reduced form.

27. The handwritten input to machine readable characters translator of claim 26 wherein said preprocessor alters said first data item in a fully information preserving manner.

28. The handwritten input to machine readable characters translator of claim 26 further comprising:
a means for adjusting the operation of said preprocessor in accordance with a set of training data.

29. The handwritten input to machine readable characters translator of claim 24 further comprising: a postprocessor configured to select one or more machine readable characters.

30. The handwritten input to machine readable characters translator of claim 29 further comprising:
a means for presenting said machine readable characters to a user.

31. The handwritten input to machine readable characters translator of claim 30 further comprising:
a means for obtaining an indication from said user of whether said machine readable characters are a correct translation of said data item.

32. The handwritten input to machine readable characters translator of claim 29 further comprising:
a means for adjusting the operation of said postprocessor in accordance with a set of training data.

33. The handwritten input to machine readable characters translator of claim 29 wherein said postprocessor comprises:
a determiner configured to determine a context of said data item.

34. The handwritten input to machine readable characters translator of claim 33 wherein said postprocessor further comprises:
a second determiner configured to determine a correctly spelled word wherein said machine readable characters appear in said correctly spelled word and said correctly spelled word is appropriate for said context.

35. The handwritten input to machine readable characters translator of claim 33 wherein said postprocessor further comprises:
a second determiner configured to determine whether machine readable characters are grammatically incorrect for said context.

36. The handwritten input to machine readable characters translator of claim 33 wherein said postprocessor further comprises:
a second determiner configured to determine a word in which said machine readable characters appear in said word and said word appeared previously in said context.

37. The handwritten input to machine readable characters translator of claim 33 wherein said postprocessor further comprises: an examiner configured to examine a set of user information.

38. The handwritten input to machine readable characters translator of claim 24 wherein said special purpose hardware unit is configured to perform a first recognition processing operation and a second recognition processing operation in parallel.

39. The handwritten input to machine readable characters translator of claim 24 wherein said special purpose hardware unit is configured to perform hidden Markov model computations.

40. The handwritten input to machine readable characters translator of claim 24 wherein said special purpose hardware unit comprises:
a means for presenting said machine readable characters to a user.

41. The handwritten input to machine readable characters translator of claim 24 wherein said data item is a combination of a plurality of handwritten symbols.

42. The handwritten input to machine readable characters translator of claim 24 further comprising:
a means for adjusting the operation of said special purpose hardware unit in accordance with a set of training data.

43. A handwritten input to machine readable characters translator comprising:
a means for obtaining a data item; and
a preprocessor coupled to a confirmed symbol observation source, special purpose hardware recognition processing computation unit, and a postprocessor coupled to the confirmed symbol observation source configured to perform one or more hidden Markov model operations upon said data item.

44. The handwritten input to machine readable characters translator of claim 43 wherein said hidden Markov model operations are forward probability calculations.

45. The handwritten input to machine readable characters translator of claim 43 wherein said hidden Markov model operations are backward probability calculations.

46. The handwritten input to machine readable characters translator of claim 43 wherein one or more wordlets are part of a symbol alphabet.

47. A computer program product comprising: a computer usable medium having computer readable program code embodied therein configured to translate handwritten input to machine readable characters, said computer program product comprising:
computer readable code configured to cause a computer to obtain a first data item; and
computer readable code configured to cause a preprocessor coupled to a confirmed symbol observation source, a special purpose recognition processing hardware, and a postprocessor coupled to the confirmed symbol observation source in the computer to perform one or more recognition processing operations upon said data item to produce a second data item.

48. The computer program product of claim 47 wherein said first data item is a handwritten symbol.

49. The computer program product of claim 47 further comprising: computer readable code configured to cause a computer to alter said first data item to a reduced form.

50. The computer program product of claim 49 wherein said computer readable code configured to cause a computer to alter is fully information preserving.

51. The computer program product of claim 49 further comprising:
computer readable code configured to cause a computer to adjust the operation of said preprocessor in accordance with a set of training data.

52. The computer program product of claim 47 further comprising:
computer readable code configured to cause a computer to select one or more machine readable characters.

53. The computer program product of claim 52 further comprising: computer readable code configured to cause a computer to present said machine readable characters to a user.

54. The computer program product of claim 53 further comprising: computer readable code configured to cause a computer to obtain an indication from said user of whether said machine readable characters are a correct translation of said data item.

55. The computer program product of claim 52 further comprising:
computer readable code configured to cause a computer to adjust the operation of said postprocessor in accordance with a set of training data.

56. The computer program product of claim 52 wherein said computer readable code configured to cause a computer to select comprises:
computer readable code configured to cause a computer to determine a context of said data item.

57. The computer program product of claim 56 wherein said computer readable code configured to cause a computer to select further comprises:
computer readable code configured to cause a computer to determine a correctly spelled word wherein said machine readable characters appear in said correctly spelled word and said correctly spelled word is appropriate for said context.

58. The computer program product of claim 56 wherein said computer readable code configured to cause a computer to select further comprises:
computer readable code configured to cause a computer to determine whether machine readable characters are grammatically incorrect for said context.

59. The computer program product of claim 56 wherein said computer readable code configured to cause a computer to select further comprises:
computer readable code configured to cause a computer to determine a word in which said machine readable characters appear in said word and said word appeared previously in said context.

60. The computer program product of claim 56 wherein said computer readable code configured to cause a computer to select further comprises:
computer readable code configured to cause a computer to examine a set of user information.

61. The computer program product of claim 47 wherein said computer readable code configured to cause a computer to perform is further configured to perform a first recognition processing operation and a second recognition processing operation in parallel.

62. The computer program product of claim 47 wherein said computer readable code configured to cause a computer to perform is further configured to perform hidden Markov model computations.

63. The computer program product of claim 47 wherein said computer readable code configured to cause a computer to perform comprises:
computer readable code configured to cause a computer to store a plurality of data items.

64. The computer program product of claim 47 wherein said data item is a combination of a plurality of handwritten symbols.

65. The computer program product of claim 47 further comprising:
computer readable code configured to cause a computer to adjust the operation of said special purpose hardware unit in accordance with a set of training data.

66. A computer program product comprising: a computer usable medium having computer readable program code embodied therein configured to translate handwritten input to machine readable characters, said computer program product comprising:
computer readable code configured to cause a computer to obtain a data item; and
computer readable code configured to cause a preprocessor, a special purpose recognition processing hardware, a confirmed symbol confirmation source, and a postprocessor of the computer to perform one or more hidden Markov model operations upon said data item.

67. The computer program product of claim 66 wherein said hidden Markov model operations are forward probability calculations.

68. The computer program product of claim 66 wherein said hidden Markov model operations are backward probability calculations.

69. The computer program product of claim 66 wherein one or more wordlets are part of a symbol alphabet.

* * * * *